United States Patent Office 2,921,305
Patented Jan. 12, 1960

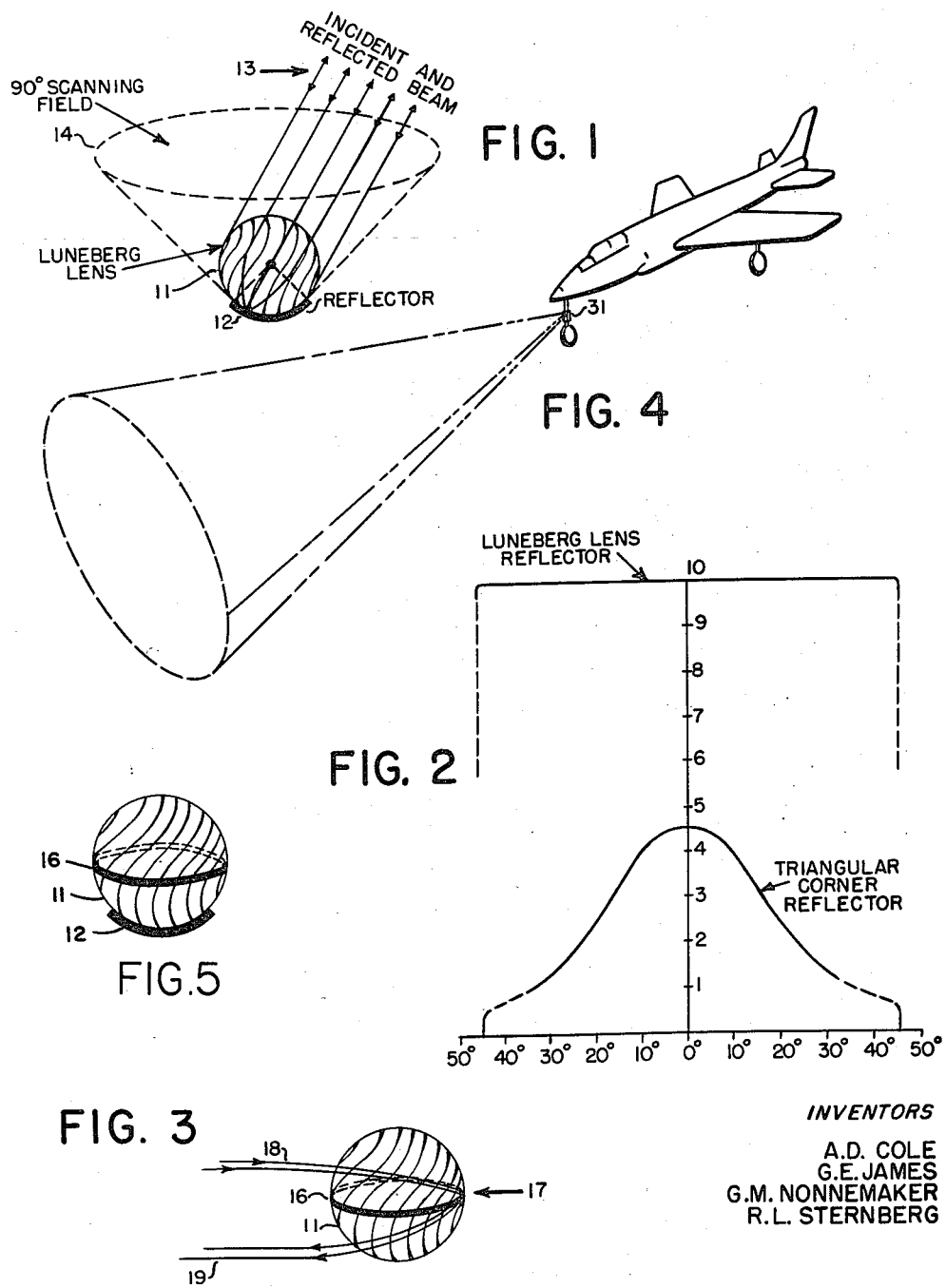

2,921,305
MICROWAVE REFLECTOR

Addison D. Cole, Natick, George E. James, Cambridge, George M. Nonnemaker, Lexington, and Robert L. Sternberg, Chestnut Hill, Mass., assignors to Laboratory for Electronics, Inc., Boston, Mass., a corporation of Delaware Application October 28, 1955, Serial No. 543,292

4 Claims. (Cl. 343—18)

The present invention relates in general to radar reflectors and in particular to a novel radar reflector employing a microwave lens coacting with a reflecting surface to provide a strong radar return signal from a passive, relatively small physical structure.

Heretofore radar reflectors have consisted of sharp-cornered physical structures such as corner reflectors, the signal strength of reflected energy being extremely sensitive to the angular orientation of incident energy with respect to the reflector axis. Furthermore the sharp corners and irregular surface area of prior art reflectors provide high resistance to the passage of air, a characteristic which seriously detracts from the desirability of attaching such a reflector to an aircraft as a radar target enhancer. Another disadvantage of prior art reflectors attched to aircraft resides in the fluctuating signal return therefrom as the maneuvering aircraft orients the reflector axis at various directions with respect to the ground radar set, resulting from the reflector sensitivity to the direction from which it is energized.

It is a primary object of the present invention to provide a radar reflector of relatively small size which provides a marked increase in the reflected energy and is substantially insensitive to the direction from which the energy impinges over a relatively large solid angle.

Another object of the invention is to provide a radar reflector which will markedly increase the energy reflected from an aircraft without disturbing the aerodynamic contours of said aircraft appreciably.

A further object of the invention is to provide a radar reflector suitable for increasing the radar return from lifeboats, life rafts or floating survivors sought by air-sea rescue craft.

Still another object of the invention is to effectively increase the range whereby a ground radar station may track an aircraft without appreciable disturbance of the aircraft performance by utilizing a relatively small, aerodynamically smooth, lightweight, radar reflector.

An object of the invention is to provide passive beacon means suitable for indicating the presence of moving or stationary surface or air targets.

Another object of the invention is to provide an improvement in radar target return from an aircraft through 360° in azimuth without a deterioration in the aircraft performance.

A further object of the invention is to provide a radar reflector which provides a maximum radar return when energized from any direction within the maximum solid angle.

Still a further object is to provide means for markedly increasing the radar return from an aircraft or other moving target, the signal strength of said return being substantially insensitive to the target orientation.

In one broad form of the invention, the apparatus comprises a microwave lens of dielectric matter with reflecting material disposed upon the surface of said lens. In another broad form the reflector comprises electromagnetic energy focusing means having the property of converging parallel rays of electromagnetic energy which may be incident from any direction within a predetermined solid angle to a relatively small area, ideally a point, on a focal surface. A reflecting surface is positioned to coincide substantially with said focal surface and reflect focused energy incident thereon back through said focusing means in a direction which is substantially parallel to said parallel rays.

One specific embodiment of the invention comprises a Luneberg lens with reflecting material disposed upon a portion of the surface thereof. In a preferred form the conducting material occupies an area upon a spherical surface bounded by a circle which is positioned so that orthogonal coplanar radii emanating from the center of the lens sphere intersect said circle at diametrically opposite points; that is, said circle is the intersection of a cone with said spherical surface, said cone having a 90° apex angle with its vertex coincident with the sphere center. In another preferred form, especially suitable for use as a passive radar beacon, the conducting material is disposed upon a surface which is bounded by two circles on the spherical surface of the Luneberg lens, said circles being in parallel planes.

Other objects and features of the invention will become apparent from the following specification when read in connection with the accompanying drawings in which:

Fig. 1 illustrates an equatorial cross-section of one preferred embodiment of the invention;

Fig. 2 is a graphical comparison of reflective characteristics of the invention with those of a conventional corner reflector;

Fig. 3 illustrates an embodiment of the invention especially suitable as a radar beacon; and Fig. 4 shows the invention attached to an aircraft as a radar target enhancer; and Fig. 5 shows an embodiment of the invention which combines the features shown in Figs. 1 and 3.

Examples of the invention embodied in the particular forms described below make frequent reference to a Luneberg lens, a microwave lens which is well known in the art, is spherical in shape, and has the property of focusing parallel rays incident upon a side of the spherical surface, to a point on the opposite surface where a diameter of the sphere, parallel to the incident rays, intersects the opposite surface. The aforesaid property results when the index of refraction, $n$, is functionally related to the radius, $r$, within the sphere by the equation $$n = \sqrt{2 - \left(\frac{r}{r_0}\right)^2}$$

$r_0$ being the outer radius of the sphere. For a detailed discussion of the Luneberg lens reference is made to "Virtual Source Luneberg Lenses," by Peeler, Kelleher and Coleman in "Transactions of the IRE," volume AP-2, No. 3, July 1954, page 94 and other references cited therein.

With reference now to Fig. 1 there is illustrated an equatorial cross-section of one preferred form of the invention. Attached to the surface of a Luneberg lens 11 is a reflector 12. In a preferred form the reflector 12 covers the surface so that orthogonal coplanar radii emanating from the center intersect the circular boundary of reflector 12 at diametrically opposite points. With such an arrangement the incident parallel rays 13 may approach the lens 11 within the 90° scanning field designated by the dotted lines 14 and be reflected, with negligible attenuation along substantially the same path wherefrom said rays were incident.

By virtue of the complete spherical symmetry of the

Luneberg lens, the effective radar cross-section presented by the apparatus of Fig. 1 within the 90° scanning sector 14 is constant and in the ideal case is denoted by $$G = \frac{4\pi^3 r^4}{\lambda^2}$$

where G is the effective radar cross-section, r is the radius of the spherical Luneberg lens, and λ is the wavelength of the incident energy.

To illustrate the advantages this novel radar reflector has over conventional reflectors it is appropriate to make a comparison with a triangular corner reflector. Whereas the corner reflector suffers from a wide variation in effective cross section dependent upon the angle of incidence of radiated energy, the novel reflector herein described has a constant effective cross section which is independent of the angle of view within the 90° region described above. On axis, where the corner reflector performs best, a Luneberg lens reflector, with the same projected area as the corner reflector, produces a radar reflection which is equivalent to that obtained from the corner reflector energized by a radar set radiating 2½ times as much power. Thus in terms of range performance, the increase in radar range effected by the novel reflector will be 25% greater than that produced by the corner reflector in the on-axis condition, and the relative performance improves as the off-axis angle is increased within substantially the entire 90° conical scanning field 14 described above.

With reference now to Fig. 2 the off-axis performance of both the triangular corner reflector and the novel radar reflector in the azimuth plane is illustrated in graphical form whereby relative signal strengths of the reflected radar signal is plotted as a function of angular deviation from the axis. The rapid deterioration of the corner reflector performance as a function of viewing angle is clearly apparent, being still worse if the plane chosen is not the azimuthal one. In contrast, the target return from the novel radar reflector is constant at all incident angles within the 90° scanning region. It is evident that such a characteristic is extremely valuable as a target enhancer on aircraft being tracked by radar. In addition the simple form factor and light weight of the novel reflector makes it easier to mount and carry on aircraft where space and weight are at a premium.

With reference now to Fig. 3, there is illustrated the invention embodied in another form which is especially useful as a passive radar beacon. A reflecting strip 16 is placed about the equator 17 of the Luneberg lens 11. The effect of this arrangement is that rays 18 above the equator are reflected back below the equator (rays 19) substantially parallel to the path of the incident rays. This property is effective within a small vertical angle symmetrically disposed about the equator circle of said sphere. Hence, vessels may determine their position by observing their relative bearing to a plurality of such passive radar reflectors positioned at known locations. When mounted horizontally in aircraft, reflectors constructed in the aforesaid manner will enhance the radar return of the aircraft uniformly from any azimuth through the predetermined vertical angle.

In another form a single Luneberg lens is covered with reflective material as illustrated in Fig. 5, preferably with the circles bounding the reflective surfaces lying in parallel planes. In this form the invention is especially suitable as a passive radar beacon which provides azimuth information to an aircraft relatively far from the beacon as a result of reflection from the circumferential strip 16 (Fig. 3), and an indication of passage over the beacon as the aircraft enters the region 14 (Fig. 1), reflection being from strip 12. Reducing the area of strip 12 in this novel combination is effective in providing a sharper indication of overhead passage. Those skilled in the art may make numerous other variations in the size, number and shape of the reflective areas to change the radiation characteristics of the reflector in accordance with the principles disclosed herein.

A radar reflector of the type described is especially advantageous when attached to an aircraft to be landed by a precision approach radar system, including the following operational advantages. It provides a strong radar return from a carrying aircraft to increase markedly the effective radiated transmitted power, the effective transmitted power at X-band being increased some forty times on one-fourth square meter aircraft, which is a common radar cross section of a jet fighter plane operationally encountered. The signal remains substantially constant independent of the aspect of the aircraft during approach, thereby preventing the confusion created by deep fades. The radar return is largely derived from a precise point on the aircraft, leading to greater accuracy than obtainable by conventional means, especially advantageous near touchdown. The resulting increase in signal strength reduces the seriousness of radar maladjustment. In particular, the necessity of servoing antennas which do not cover fully the entire approach path is eliminated. It will enhance the target to clutter ratio and permit more reliable tracking in the presence of such clutter, especially precipitation clutter. The device works well for all microwave frequencies without modification, the effective cross section merely changing in inverse proportion to the square of the wavelength.

Referring to Fig. 4, the novel radar reflector 31 is illustrated attached to an aircraft. Note that with the reflector attached to the forward landing gear as shown, the precise location of the aircraft landing gear relative to the touchdown point is observable on precision approach radar apparatus of the type described in the copending application of Levin, Repella and Rosen, Serial No. 512,665, filed June 2, 1955 and entitled Radar Data Processing, even in the presence of ground clutter, thereby enabling extremely accurate landing instructions to be directed to the aircraft. It is also to be observed that the reflector, attached as shown, is shielded by the aircraft upon retraction of the landing gear, preventing enemy radar systems from utilizing the reflector properties to locate the aircraft when on an operational mission.

Other uses will suggest themselves to those skilled in the art who may make numerous modifications of and departures from the particular embodiments described in connection with the invention disclosed herein. Consequently the invention is to be construed as limited only by the spirit and scope of the appended claims.

What is claimed is:

1. A microwave reflector comprising a Luneberg lens sphere, reflecting material disposed upon a first portion of the surface of said sphere bounded by a first circle of said surface, and a strip of reflecting material disposed upon a second portion of said surface spaced from said first portion and bounded by a pair of circles thereof which are parallel to said first circle.

2. A microwave reflector comprising a Luneberg lens sphere, a cap-shaped reflector disposed upon a portion of the surface of said sphere in intimate contact therewith, said cap-shaped reflector being bounded by a circle of diameter less than that of said sphere, and a strip of reflecting material disposed upon said sphere in intimate contact therewith, said strip being defined by a pair of circles symmetrically disposed about a circle of largest diameter on said surface, said last mentioned circle defining a plane parallel to the plane of said boundary circle of said cap-shaped reflector.

3. A microwave reflector comprising a Luneberg lens sphere, a cap-shaped reflector disposed upon a portion of the surface of said sphere in intimate contact therewith, said cap-shaped reflector being bounded by a circle of diameter less than that of said sphere, and a strip of reflecting material disposed upon said sphere in intimate contact therewith, said strip being defined by a pair of circles symmetrically disposed about a circle of largest diameter on said surface.

4. A radar reflector comprising a spherical-shaped microwave lens having refractive index designated $n$ functionally related to the radius, designated $r$, within the sphere by $$n = \sqrt{2 - \left(\frac{r}{r_0}\right)^2}$$

where $r_0$ is the outside radius of said sphere, and reflecting material disposed upon an area of said surface bounded by a circle thereon, coplanar orthogonal radii of said sphere intersecting said circle at diametrically opposite points.

References Cited in the file of this patent

UNITED STATES PATENTS 2,580,921   Iams _____ Jan. 1, 1952

OTHER REFERENCES

Virtual Source Luneberg Lenses, Peeler, Kelleher and Coleman, I.R.E. Transactions, vol. AP-2, No. 3, July 1954, pp. 94–99. (Copy in Div. 44.)